(12) United States Patent
Wright

(10) Patent No.: US 8,299,180 B2
(45) Date of Patent: Oct. 30, 2012

(54) GLYOXALATED N-VINYLAMINE

(75) Inventor: Matthew D. Wright, Plover, WI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/113,385

(22) Filed: May 23, 2011

(65) Prior Publication Data

US 2011/0224374 A1   Sep. 15, 2011

Related U.S. Application Data

(62) Division of application No. 12/290,465, filed on Oct. 31, 2008.

(60) Provisional application No. 61/001,817, filed on Nov. 5, 2007.

(51) Int. Cl.
  *C08F 8/28* (2006.01)

(52) U.S. Cl. ............ 525/155; 525/154; 525/328.2; 525/329.4; 525/383; 522/129; 522/130

(58) Field of Classification Search .... 162/164.1–164.6, 162/166, 168.1–168.3; 522/129, 113, 1; 525/154, 157, 293, 328.2, 383, 155, 3, 28.2, 525/329.4

See application file for complete search history.

(56) References Cited

U.S. PATENT DOCUMENTS

| | | | |
|---|---|---|---|
| 3,556,392 A | 1/1971 | Robin | |
| 3,580,736 A | 5/1971 | Moyer et al. | |
| 3,728,214 A | 4/1973 | Espy | |
| 3,759,197 A | 9/1973 | Bracke | |
| 4,103,742 A | 8/1978 | Swanson | |
| 4,144,123 A | 3/1979 | Scharf et al. | |
| 4,155,405 A | 5/1979 | Vio | |
| 4,217,425 A | 8/1980 | Ballweber et al. | |
| 4,421,602 A | 12/1983 | Brunnmueller et al. | |
| 4,506,062 A | 3/1985 | Flesher et al. | |
| 4,528,321 A | 7/1985 | Allen et al. | |
| 4,599,379 A | 7/1986 | Flesher et al. | |
| 4,603,176 A | 7/1986 | Bjorkquist et al. | |
| 4,605,702 A | 8/1986 | Guerro et al. | |
| 4,673,704 A | 6/1987 | Flesher et al. | |
| 4,954,538 A | 9/1990 | Dauplaise et al. | |
| 5,037,927 A | 8/1991 | Itagaki et al. | |
| 5,041,503 A | 8/1991 | Dauplaise et al. | |
| 5,085,787 A | 2/1992 | Pinschmidt, Jr. et al. | |
| 5,281,307 A | 1/1994 | Smigo et al. | |
| 5,290,880 A | 3/1994 | Moench et al. | |
| 5,320,711 A | 6/1994 | Dauplaise et al. | |
| 5,374,334 A | 12/1994 | Sommese et al. | |
| 5,723,022 A | 3/1998 | Dauplaise et al. | |
| 5,863,879 A | 1/1999 | Zirnstein et al. | |
| 6,001,920 A | 12/1999 | Ghafoor et al. | |
| 6,031,037 A | 2/2000 | Ghafoor et al. | |
| 6,159,340 A | 12/2000 | Niessner et al. | |
| 6,576,086 B1 | 6/2003 | Ettl et al. | |
| 6,616,807 B1 | 9/2003 | Dyllick-Brenzinger et al. | |
| 6,797,785 B1 | 9/2004 | Hund et al. | |
| 6,824,650 B2 * | 11/2004 | Lindsay et al. | 162/168.2 |
| 6,824,659 B2 | 11/2004 | Bayley et al. | |
| 7,034,068 B1 | 4/2006 | Negele et al. | |
| 7,090,745 B2 | 8/2006 | Beckman et al. | |
| 7,488,403 B2 * | 2/2009 | Hagiopol et al. | 162/168.3 |
| 7,670,459 B2 * | 3/2010 | Garnier et al. | 162/164.4 |
| 7,875,676 B2 | 1/2011 | Wright | |
| 7,902,312 B2 * | 3/2011 | Gu et al. | 526/310 |
| 2004/0118540 A1 * | 6/2004 | Garnier et al. | 162/164.1 |
| 2005/0161181 A1 | 7/2005 | St. John et al. | |
| 2005/0187356 A1 | 8/2005 | Hagiopol et al. | |
| 2006/0016906 A1 | 1/2006 | Matsumoto | |
| 2006/0065380 A1 | 3/2006 | Garnier et al. | |
| 2006/0162886 A1 | 7/2006 | Smith et al. | |
| 2008/0064819 A1 | 3/2008 | Wright | |
| 2011/0083821 A1 | 4/2011 | Wright | |

FOREIGN PATENT DOCUMENTS

| | | |
|---|---|---|
| DE | 4413720 | 10/1995 |
| EP | 0102760 A2 | 3/1984 |
| EP | 0126528 A2 | 11/1984 |
| EP | 0150933 A2 | 8/1985 |
| EP | 0170394 A2 | 2/1986 |
| GB | 1576447 A | 10/1980 |
| WO | WO-95/29221 | 11/1995 |
| WO | WO-9831748 A1 | 7/1998 |
| WO | WO-9831749 A1 | 7/1998 |
| WO | WO-0011046 A1 | 3/2000 |
| WO | WO-2006016906 A1 | 2/2006 |
| WO | WO-2006102059 A2 | 9/2006 |

OTHER PUBLICATIONS

Search Report dated May 9, 2007, issued in Chilean Application No. 2581-07.
International Search Report mailed Jul. 11, 2008, in International Application No. PCT/EP2007/059096 filed Aug. 31, 2007.
Search Report dated Feb. 7, 2007, issued in British Application No. GB0620842.5.

* cited by examiner

Primary Examiner — Matthew Daniels
Assistant Examiner — Dennis Cordray
(74) Attorney, Agent, or Firm — Drinker Biddle & Reath

(57) ABSTRACT

The present invention is directed to compositions comprising a cellulose reactive functionalized polyvinylamine first adduct, compositions comprising combinations of the cellulose reactive functionalized polyvinylamine first adduct and cellulose reactive functionalized polyvinylamide second adduct, methods for preparing first adduct and second adduct blends and finally methods of increasing the wet or dry strength of paper by incorporation into the paper furnish or coating a paper or board with said adducts.

13 Claims, No Drawings

GLYOXALATED N-VINYLAMINE

This application is a divisional application of U.S. Ser. No. 12/290,465, filed Oct. 31, 2008, which claims the benefit of U.S. Provisional Application Nos. 61/001,817, filed Nov. 5, 2007, herein incorporated entirely by reference.

FIELD OF THE INVENTION

The present invention is directed to compositions comprising a cellulose reactive functionalized polyvinylamine first adduct, compositions comprising combinations of the cellulose reactive functionalized polyvinylamine first adduct and cellulose reactive functionalized polyvinylamide second adduct, methods for preparing first adduct and second adduct blends and finally methods of increasing the wet or dry strength of paper by incorporation into the paper furnish or coating a paper or board with said adducts.

BACKGROUND OF THE INVENTION

Polyvinylamines

Polyvinylamines and the method of making are well known in the literature. Polyvinylamines are typically prepared by partially hydrolyzing N-vinylformamide polymers. See for example, U.S. Pat. Nos. 4,421,602, 6,576,086 6,616, 807 5,290,880 6,159,340, 7,034,068 and 6,797,785, herein incorporated entirely by reference. The formed polyvinylamines are known for enhancing retention and drainage in the formation of paper. Faster drainage of the stock on the papermaking machine enables the speed of the machine and hence production to be increased.

Functionalized and crosslinked polyvinylamines are also known in the literature. For example, U.S. Pat. No. 7,090,745, herein incorporated entirely by reference, describes a hydrophilic polymer containing primary and/or secondary amines and at least one sugar containing a reducible function such as an aldehyde or hemiacetal. The resulting hydrogels are alleged to increase paper strength.

U.S. Pat. No. 5,281,307 discloses a crosslinked polyvinylalcohol/vinylamine. The crosslinked copolymer is added at the dry end step of a conventional papermaking process.

U.S. Pat. No. 6,824,659 discloses combinations of polyvinylamine with a complexing agent in order to improve the wet strength properties of paper. The complexing agent may be a glyoxalated polyacrylamide.

U.S. Publication App. Nos. 2006/0065380 and 2004/0118540 also disclose combinations of polyvinylamine with a glyoxalated polyacrylamide for purposes of improving the wet strength properties of paper.

Glyoxalated Vinylamide Polymers

The use of synthetic water-soluble polymers as wet end additives for the strengthening of paper and paperboard is widely practiced. The use of cellulose reactive water-soluble vinylamide copolymers as paper strengthening agents is also common. One particular class of vinylamide polymer strength aids includes vinylamide polymers which are modified with glyoxal in such a way as to be thermosetting.

Glyoxalated vinylamide polymers are described for example in U.S. Pat. Nos. 3,556,392, 4,217,425, 4,605,702, herein entirely incorporated by reference.

PCT Published Application No. 2006/016906 describes a cationic vinylamide crosslinked polymer which is treated with a cellulose reactive agent such as glyoxal to impart strength to paper.

U.S. Pat. Nos. 4,954,538, 5,041,503 and 5,320,711, herein incorporated by reference, teach microparticles of cross linkable, glyoxalated-polyvinylamide prepared by reverse phase microemulsion polymerization and describe adding glyoxal to the micro emulsion polymer to form a glyoxalated polymer.

U.S. Published Application No. 2008/0064819, herein incorporated entirely by reference teaches an aqueous reaction of a cellulose reactive agent such as glyoxal with polyvinylamide. The reaction takes place at low polyvinylamide concentrations. The described reaction conditions give cellulose reactive polyvinylamide adducts which are shown to give improved wet and dry strength in paper.

The inventor has discovered that the reaction of polyvinylamine with at least a dialdehyde produces a functionalized polyvinylamine which gives paper or board of improved wet and/or dry strength.

Furthermore, it has also been discovered that functionalizing both a polyvinylamine and a polyvinylamide with a cellulose reactive agent such as glyoxal simultaneously gives at least first and second adducts which when applied to a furnish or applied as a paper or board coating give unexpected wet and/or dry strength.

Additionally, it has also been discovered that the cellulose reactive functionalized polyvinylamide disclosed in U.S. Published Application No. 2008/0064819 when combined with polyvinylamine (unfunctionalized) and simultaneously added (or added simultaneously but separately) to a furnish or coated onto a paper or board will also give improved wet and/or dry strength to the paper or board.

A premixture formed from polyvinylamine (unfunctionalized) with the glyoxalated polyvinylamide product according to U.S. Published Application No. 2008/0064819 may boost the performance of the glyoxalated product especially in papermaking systems containing high amounts of anionic trash (pitch, stickies, white pitch etc.).

It is also believed that premixing of polyvinylamine (glyoxalated or unglyoxalated) with standard glyoxalated polyvinylamide (i.e. U.S. Pat. Nos. 3,556,392, 4,217,425, 4,605, 702) before addition to the furnish in a papermaking process also boosts performance in papermaking systems containing high amounts of anionic trash.

Although not wishing to be bound by theory, it is possible that the highly charged cationic polymer (polyvinylamine) when combined with a lower charged cationic polymer (such as a cationic glyoxalated polyvinylamide) "blocks" anionic trash in the papermaking system from interfering with the lower charged cationic polymer, so that the lower charged cationic polymer may work more efficiently.

SUMMARY OF THE INVENTION

Thus the present invention encompasses several compositional embodiments: Firstly, the invention embodies a cellulose reactive polyvinylamine first adduct comprising a reaction product of a starting polyvinylamine with at least a dialdehyde to form a first adduct.

The adduct is preferably not an adduct of a sugar containing a reducible functionality such as an aldehyde or hemiacetal. Furthermore, the starting polyvinylamine is typically a polymer or copolymer of N-vinylformamide or N-vinylacetamide which has been at least partially hydrolyzed to cleave the formamide or acetamide groups imparting a degree of primary amino functionality to the polymer prior to the reaction with the dialdehyde.

The partially hydrolyzed polymer or copolymer of N-vinylformamide or N-vinylacetamide preferably does not incorporate vinylalcohol monomer units.

Thus the partially hydrolyzed starting polyvinylamine is a polymer or copolymer of N-vinylformamide or N-vinylacetamide and is characterized by amine functionality as well as amide functionality. The amide functionality and amine functionality on the at least partially hydrolyzed N-vinylformamide or N-vinylacetamide may then be reacted with a dialdehyde forming a complex mixture of amide and amine adducts on the starting polyvinylamine.

Therefore when referring to the cellulose reactive polyvinylamine adduct (the first adduct) of the present invention, what is meant is a cellulose reactive copolymer selected from the group consisting of at least partially hydrolyzed N-vinylformamide or N-vinylacetamide which is reacted with at least a dialdehyde forming a complex mixture.

The first adduct formation is for example carried out at starting polyvinylamine concentrations during formation of the reaction products which are less than about 4 weight percent, preferably less than about 3.5 weight percent and most preferably less than about 3 weight percent and especially less than about 2 or 1.5 weight percent the reaction mixture at any stage during the first and second adduct reactions.

The first adduct composition as described above may further comprise a cellulose reactive functionalized polyvinylamide second adduct to form a blend, with the proviso that the first and second cellulose reactive adducts are different.

Additionally, it is envisioned to combine polyvinylamine (untreated or first adduct as described above) and a cellulose reactive polyvinylamide as a premix, preferably an aqueous premix. The premix may be added to a cellulosic furnish or added to wet paper or board as a coating. The polyvinylamine and polyvinylamide are different.

Thus a premixed blend of cellulose reactive first and second adducts is encompassed by the invention wherein the first adduct is defined as above. More specifically, the cellulose reactive second adduct is a reaction product of a starting polyvinylamide with at least a dialdehyde, wherein the starting polyvinylamide is a polymer or copolymer formed from at least (meth)acrylamide, N-alkyl (meth)acrylamide or mixtures thereof.

Preferably, this second adduct is a copolymer of (meth)acrylamide and diallydimethylammonium chloride reacted with a dialdehyde such as glyoxal.

The first and second adducts may be formed separately then combined in a premix, preferably an aqueous premix. The premix blend may then be added to the furnish or as a coating on the paper or board.

The premix blend for example may comprise first and second adducts which may be respectively defined as glyoxalated polyvinylamine and glyoxalated polyvinylamide.

The glyoxalated polyvinylamine is formed by reacting a dialdehyde (glyoxal) with a starting polyvinylamine formed from N-vinylformamide or N-vinylacetamide which polyvinylamine is at least partially hydrolyzed to impart a degree of primary amino functionality, prior to the reaction with the dialdehyde (glyoxal). The glyoxalated polyvinylamide is formed by reacting a dialdehyde (glyoxal) with a starting polyvinylamide formed by reacting an ethylenically unsaturated amide such as (meth)acrylamide, N-alkyl (meth)acrylamide or mixtures thereof.

The cellulose reactive agent is preferably a dialdehyde.

Additionally, the above blends of adducts may be formed simultaneously. That is, the first and second adduct reactions may be run simultaneously within the same reaction mixture. Since both the polyvinylamide and polyvinylamine are reactive with dialdehydes, these reactions together (in the same pot) form not only a first and second adducts simultaneously, but very likely form crosslinked products of the polyvinylamide and polyvinylamine polymers, making at least three different adducts.

A particularly preferred aqueous blend of adducts according to the invention is formed, wherein both the first and second adduct reactions are carried out simultaneously and wherein both the starting polyvinylamide and the starting polyvinylamine concentrations during formation of the reaction products are less than about 4 weight percent, preferably less than about 3.5 weight percent and most preferably less than about 3 weight percent and especially less than about 2 or 1.5 weight percent the reaction mixture at any stage during the first and second adduct reactions. For example, the adduct reactions may run at 2.5, 2 or 1.0 wt. % of the total polyvinylamide and the polyvinylamine concentrations.

To illustrate more clearly, assuming a 50/50 weight mixture of the starting polymers, the concentration of the polyvinylamide during formation of the reaction product may be 2 wt. % and the concentration of the polyvinylamine may be also be 2 wt. %, giving a total concentration of the starting polymers of 4 wt. %. Thus these concentrations are meant as total concentration, not of the individual components, i.e. 3% means 1.5% polyvinylamine and 1.5% polyvinylamide when assuming a 50/50 mixture.

The starting polyvinylamide is for example defined as a polymer or copolymer formed from (meth)acrylamide or N-(meth)acrylamide before reaction with a dialdehyde.

The starting polyvinylamine is for example defined as at least a partially hydrolyzed polymer or copolymer of N-vinylformamide or N-vinylacetamide before reaction with a dialdehyde.

The starting polyvinylamine is different than the starting polyvinylamide.

Thus the invention also encompasses a blend of at least a first and a second adduct, which adducts are formed by reacting a mixture of a polyvinylamine and a polyvinylamide with a dialdehyde, wherein the polyvinylamine is a polymer formed from N-vinylformamide or N-vinylacetamide which polymer is at least partially hydrolyzed to impart a degree of primary amino functionality, prior to the reaction with the dialdehyde and the polyvinylamide is a polymer formed from an ethylenically unsaturated amide such as for instance (meth)acrylamide, N-(meth)acrylamide or mixtures thereof.

The starting polyvinylamine and starting polyvinylamide polymers are different from each other.

A paper or board incorporating the first adduct or the blends described above is also envisioned, wherein the first adduct or blends of adducts are added to the paper or board in the wet end of the papermaking process The present invention also embodies several methods for preparation of the first adduct and preparation of the blends of adducts:

A method for preparing a cellulose reactive functionalized polyvinylamine first adduct comprises the steps of reacting a starting polyvinylamine and a cellulose reactive agent and forming a first adduct, wherein the starting polyvinylamine is formed from an at least partially hydrolyzed N-vinylformamide or N-vinylacetamide (co)polymer and the cellulose reactive agent is at least a dialdehyde.

It is preferred that the partially hydrolyzed N-vinylformamide or N-vinylacetamide polymer (stiffing polyvinylamine) is a homopolymer or copolymer formed from the group consisting of partially hydrolyzed N-vinylformamide or partially hydrolyzed N-vinylacetamide or a mixture thereof and that the dialdehyde is not a sugar, saccharide or polysaccharide.

A method for increasing the wet or dry strength of paper or board comprising the steps of:

a) providing an aqueous slurry of cellulosic fibers;

b) adding the cellulose reactive polyvinylamine first adduct or a blend of first and second adducts to the aqueous slurry;

c) forming a web from the aqueous slurry formed in step b); and d) drying the web.

A method for increasing the wet or dry strength of paper or board may also be accomplished by a) spraying, coating or otherwise applying the first adduct or the blend of first and second adducts as described above onto a wet web, paper or board; and b) drying the coated wet web, paper or board.

The first and second adducts or blends whether added in the wet end or applied as a coating on paper may be added as a premix. Thus both adducts may be physically combined in a blend (premix) or added separately but simultaneously at the wet end of a papermaking process or as a coating onto paper or board.

DETAILED DESCRIPTION OF THE INVENTION

Definition of Basic Terms

For the purposes of the invention, the reaction of the amine groups of polyvinylamine with glyoxal or the reaction of the amide groups of the polyvinylamide will be referred to as a "glyoxalation reaction" or simply "glyoxalation", in this application. The product of said glyoxalation reactions will be referred to as glyoxalated-polyvinylamine first adduct or glyoxalated-polyvinylamide second adduct or just plain adduct(s).

The term "catalyzed glyoxalation reaction" refers to a glyoxalation reaction carried out in an environment such that physical or chemical conditions cause the reaction to progress at a moderate to accelerated rate, wherein the desired reaction is obtained in less than about 12 hours, or more preferably in less than 6 hours, less than 3 hours or even less than about 1 hour. Preferably the glyoxalation reaction of the polyvinylamide is effected under alkaline conditions or addition of a base or basic buffer.

The polyvinylamine reaction with glyoxal may be carried out under basic, neutral or acidic conditions.

The glyoxalation reaction between the polyvinylamine and/or the polyvinylamide may take place in an inverse emulsion, microemulsion or substantially aqueous reaction mixture. The preferred method of adduct formation is in a substantially aqueous solution.

Preparation by inverse emulsion or microemulsion techniques are well known in the are and are described in detail in U.S. Pat. Nos. 4,954,538, 5,041,503 and 5,320,711, herein incorporated entirely by reference.

Such inverse emulsions or microemulsions display a particle size that may range from about 25 nm to about 2000 nm.

The term "aqueous reaction mixture" for the purposes of the invention means that the adduct formation may be carried out substantially in the absence of organic oils. For example, it is known to glyoxalate a vinylamide polymer in an inverse micro-emulsion which comprises both an oil phase and a water phase. The oil phase comprises at least one hydrocarbon. Typically the oil phase will be mineral oil, toluene, fuel oil, kerosene, odorless mineral spirits, or mixtures of the like. The weight of oil in these prior art processes often exceeds the weight of polymer formed. Thus for the purposes of the invention, adduct formation may be carried out in a "substantially aqueous reaction mixture" wherein the presence of organic oils does not exceed the weight of vinylamide or vinylamine polymer, preferably oil weight does not exceed 50 wt. % of the vinylamide or vinylamine polymer and most preferably there may not be significant amounts of oil present during the first or second adduct formation. Substantially aqueous means oil makes up less than about 20 wt. % of the vinylamide or vinylamine polymer and preferably less than 10, or less than about 5 or less than about 1, 0.5 or 0.1 wt. %. The adduct formation will typically occur in the absence of a paper furnish and/or a paper substrate. In other words the adduct formation may occur before its application in the wet end or dry end of the papermaking process.

Molecular weight for purposes of the invention means weight average molecular weight ($M_w$).

Other materials which are soluble or miscible in water may additionally be present in the aqueous reaction mixture for forming the first adduct and/or the second adduct. Chelating agents, electrolytes such as sodium chloride, surfactant and polar solvents such as methanol may be present in the reaction mixture. Low molecular weight cationic polymers may also be present in the reaction mixture, for example polyDADMAC may be present. Inorganic cationic flocculants may also be present, such as ferric chloride, aluminum sulfate, poly-aluminum chloride and aluminum chlorohydrate, etc.

The term "polyvinylamine" and "polyvinylamide" refers to the starting polymer before functionalization with the cellulose reactive agent. The starting polyvinylamine or polyvinylamide before functionalization may be a homopolymer or copolymer.

The starting polyvinylamine comprises amide and amine functionality as explained above. For purposes of clarity the starting polyvinylamine is distinguished from the starting polyvinylamide because the starting polyvinylamine is formed from partially hydrolyzed N-vinylformamide or N-vinylacetamide and the starting polyvinylamide is formed from (meth)acrylamide or N-alkyl(meth)acrylamide. Thus the two starting polymers are different.

A copolymer for purposes of the invention is a polymer formed from two or more monomers.

The term "monomer" for purposes of the invention refers to an ethylenically unsaturated compound capable of being polymerized.

The term "monomer unit" for purposes of the invention refers to the incorporation of the monomer into a polymer after polymerization.

When the term "first adduct" is referred to within this application, this means the reaction product of at least a dialdehyde with a polyvinylamine.

When the term "second adduct" is referred to within this application, this means the reaction product of at least a dialdehyde with a polyvinylamide.

"Blends" means blends of a reaction product of at least a dialdehyde with a polyvinylamine and a reaction product of at least a dialdehyde with a polyvinylamide or blends of a polyvinylamine and a reaction product of at least a dialdehyde with a polyvinylamide.

Premixed blends for purposes of the invention means direct mixtures of both the first and second adducts or blends of polyvinylamine (unfunctionalized) and the second adduct before addition to the papermaking process. The premixed blend may then be added to either the furnish directly (wet end addition) or may be incorporated into a coating (dry end addition) for paper or board.

Polyvinylamine

The starting polyvinylamine may be a homopolymer or a copolymer of N-vinylformamide or N-vinylacetamide, wherein some mole % of the formyl or acetamide groups are hydrolyzed to form a polyvinylamine. The degree of hydrolysis may vary from about 1 to about 100 mole % or from about 5 to about 95 mole % or even about 10 to about 90 mole %. For example, commercial N-vinylformamide polymer is available in which 30 mole % of the formyl groups are hydrolyzed. Thus the polyvinylamine will most typically be a N-vinylformamide polymer which has been hydrolyzed to give a polyvinylamine wherein the mole % of amine will range from about 1 to about 100 mole %, about 10 to about 100 mole %, about 20 to about 100 mole %, about 30 to about 100 mole %, about 40 to about 95 mole % or about 50 to about 95 mole %.

The amine content of the polyvinylamine provides the sites to which the cellulose reactive agent or glyoxal substituents are attached. It is also possible that the remaining unhydrolyzed amide sites on the polyvinylamine are functionalized.

It is also possible that the partially hydrolyzed N-vinylformamide polymer is a copolymer.

Suitable monoethylenically unsaturated monomers, for example may be copolymerized with N-vinylcarboxamides. These suitable monoethylenically unsaturated monomers may for example be selected from the group comprising vinyl esters of saturated carboxylic acids of from 1 to 6 carbon atoms, such as vinyl formate, vinyl acetate, vinyl propionate and vinyl butyrate, and vinyl ethers, such as $C_1$-$C_8$-alkyl vinyl ethers, eg. methyl or ethyl vinyl ether.

It is preferred that the partially hydrolyzed N-vinylformamide or N-vinylacetamide contain no polyvinylalcohol monomer units.

Vinylacohol units typically are derived from polymers formed from vinylacetate (vinylpropionate etc.) which has been hydrolyzed to yield polyvinylalcohol.

Further suitable comonomers are ethylenically unsaturated $C_3$-$C_6$-carboxylic acids, for example acrylic acid, methacrylic acid, maleic acid, crotonic acid, itaconic acid and vinylester acid, and their alkali metal and alkaline earth metal salts, esters, amides and nitriles of the stated carboxylic acids, for example methyl acrylate, methyl methacrylate, ethyl acrylate and ethyl methacrylate. Further suitable carboxylic esters are derived from glycols or polyalkylene glycols, only one OH group being esterified in each case, eg. hydroxyethyl acrylate, hydroxyethyl methacrylate, hydroxypropyl acrylate, hydroxybutyl acrylate, hydroxypropyl methacrylate, hydroxybutyl methacrylate and acrylic monoesters of polyalkylene glycols having a molar mass of from 500 to 10,000. Further suitable comonomers are esters of ethylenically unsatured carboxylic acids with amino alcohols, for example dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, dimethylaminobutyl acrylate and diethylaminobutyl acrylate. The basic acrylates can be used in the form of the free bases, of the salts with mineral acids, such as hydrochloric acid, sulfuric acid or nitric acid, of the salts with organic acids, such as formic acid, acetic acid or propionic acid, or of sulfonic acids or in quarternized form. Suitable quarternizing agents are for example dimethyl sulfate, diethyl sulfate, methyl chloride, ethyl chloride and benzyl chloride.

The hydrolysis reaction carried out on the N-vinylformamide is carried out by the action of acids, bases or enzymes by known methods. See for example, U.S. Pat. Nos. 4,421,602, 5,290,880 and 6,797,785.

The average molecular weight of the polyvinylamines (before glyoxalation) are for example, from 1000 to 10 million, preferably from 10,000 to 5 million Daltons (determined by light scattering). This corresponds, for example, to K values of from 5 to 300, preferably from 10 to 250 (determined according to H. Fikentscher in 5% strength aqueous sodium chloride solution at 25° C. and at a polymer concentration of 0.5% by weight).

The average molecular weight of the starting polyvinylamine before reaction with a dialdehyde may be greater than 25,000.

Typical Mw of polyvinylamine (before glyoxalation) may vary from about 25,000 to about 500,000. For example, ranges may be about 200,000 to about 400,000 or 150,000 to about 400,000. The Mw of polyvinylamine may vary from about 25,000 to about 400,000.

The starting polyvinylamine polymer or formed first adduct may be crosslinked, branched or otherwise structured or linear. For example, the starting vinylamine polymer or formed vinylamine polymer adduct may be linear, crosslinked, chain-transferred, or crosslinked & chain-transferred (structured).

Possible crosslinking agents are for example listed below.

Polyvinylamide

The polyvinylamide will normally be formed from monomers which contain an amide functionality. Suitable vinylamide monomers are (meth)acrylamide, $C_{1-4}$ mono substituted (meth)acrylamides such as N-methyl (meth)acrylamide, N-ethyl(meth)acrylamide. The most preferred vinyl monomers are acrylamide and methacrylamide.

The term (meth)acrylamides includes both acrylamide and methacrylamide.

The vinylamide content of the polymers of the present invention provides the sites to which the cellulose reactive agent or dialdehyde are attached. The minimum proportion of vinylamide units which should be present should be sufficient so that the glyoxalated polymer is thermosetting, such that the glyoxalated polymer forms a water-insoluble film when it is laid down from water solution on a glass plate and heated for 5 minutes at about 105° C.

Thus the vinylamide polymer (before glyoxalation) should be formed from at least about 10 wt. % vinylamide monomers. Preferably, the vinylamide polymer is formed from at least about 20 to about 100 wt. % vinylamide monomers. For example, the vinylamide polymer is at least formed from about 20 to about 99 wt %, at least about 25 to about 90 wt. % vinylamide monomers, or at least about 50 wt. % and most preferably at least about 70 wt % vinylamide monomers. The wt. % is based on the weight of the total weight of monomers charged to form the vinylamide polymer.

Once the monomers polymerize, they become incorporated units in the polymer.

Thus there may be units in the polymers of the present invention which may confer ionic properties upon the polymer, or those which act as diluents or spacers, or which confer special properties, for example, improved or diminished water-solubility.

Ionic comonomers, which can be used in conjunction with vinylamide monomers, can be cationic, potentially cationic, anionic, potentially anionic or amphoteric. When using cationic comonomers, one or more cationic monomers can be used, and the total amount of cationic monomer should be such that a glyoxal adduct of the vinylamide copolymer is self-substantive to cellulose fibers in aqueous suspension.

Cationic comonomers are especially preferred as the cationic charge gives substantivity to cellulose fiber.

Suitable cationic monomers or potentially cationic monomers include diallyldialkyl amines, 2-vinylpyridine, 2-(dialkylamino) alkyl (meth)acrylates, dialkylamino alkyl (meth) acrylamides, including acid addition and quaternary ammonium salts thereof. Specific examples of such cationic monomers or potentially cationic monomers are diallyldimethyl ammonium chloride, (meth)acryloyloxy ethyl trimethylammonium chloride (dimethyl amino ethyl (meth) acrylate, methyl chloride quaternary salt), 2-vinyl-N-methylpyridinium chloride, (p-vinylphenyl)-trimethylammonium chloride, (meth)acrylate 2-ethyltrimethylammonium chloride, 1-methacryloyl-4-methyl piperazine, Mannich poly acrylamides i.e. polyacrylamide reacted with dimethyl amine formaldehyde adduct to give the N-(dimethyl amino methyl) and (meth)acrylamido propyltrimethyl ammonium chloride.

Potentially cationic monomers may be for example monomers that give a cationic charge under acidic conditions such as when an amine functionality on the potentially cationic monomer is protonated.

The amount of cationic comonomer may range from about 0% to about 90 wt. %, about 0.1 to about 50 wt %, about 0.1 to about 40, about 0.1 to about 30, about 0.1 to about 25 wt % or about 0.1 to about 15 or about 10 wt. percent. The wt. % is based on the total weight of monomer(s) charged to form the vinylamide polymer.

Furthermore, the vinylamide monomers may be copolymerized with vinyl tertiary amines such as dimethylaminoethyl acrylate or vinylpyridine. The tertiary amine groups can then be converted into quaternary ammonium groups by reaction with methyl chloride, dimethyl sulfate, or benzyl chloride to produce a cationic polymer. Moreover, polyacrylamide can be rendered partially cationic by reaction with glycidyl dimethyl ammonium chloride.

Suitable anionic monomers may be selected from vinyl acidic material such as acrylic acid, methacrylic acid, maleic acid, allyl sulfonic acid, vinyl sulfonic acid, itaconic acid, fumaric acid, potentially anionic monomers such as maleic anhydride and itaconic anhydride and their alkali metal and ammonium salts, 2-acrylamido-2-methyl-propanesulfonic acid and its salts, sodium styrene sulfonate and the like. Alternatively, if the starting vinylamide polymer is polyacrylamide, it may be partially hydrolysed to achieve some anionic character then functionalized with the cellulose reactive agent.

Potentially anionic monomers may be for example acrylamide, which when partially hydrolysed forms an acid which may give anionic character to the polymer under basic conditions. Alternatively, the potentially anionic monomers may be for instance an anhydride monomer, such as maleic anhydride or itaconic anhydride, which can be hydrolysed to form the corresponding acid.

As stated above, the polyvinylamide polymer may be amphoteric; that is the polymer may include anionic and cationic functionality. The amphoteric vinylamide polymer may be formed from both anionic and cationic monomers or alternatively from zwitterionic monomers. The various monomers (anionic, cationic and/or zwitterionic) may be reacted in any wt. ratio to form the amphoteric vinylamide polymer. It is preferable that the predominate charge on the formed amphoteric vinylamide polymer be cationic. Thus, the mole % of cationic monomer dominates over the mole % anionic monomer incorporated into the amphoteric vinylamide polymer.

Suitable non-ionic monomers other than the vinylamide may be selected from the group consisting of (meth) acrylic esters such as octadecyl (meth)acrylate, ethyl acrylate, butyl acrylate, methylmethacrylate, hydroxyethyl (meth)acrylate and 2-ethylhexylacrylate; N-alkyl acrylamides, N-octyl (meth)acrylamide, N-tert-butyl acrylamide, N-vinylpyrrolidone, N,N-dialkyl (meth)acrylamides such as N,N'-dimethyl acrylamide; styrene, vinyl acetate, hydroxy alkyl acrylates and methacrylate such as 2-hydroxy ethyl acrylate and acrylonitrile.

The starting polyvinylamide polymer or formed second adduct may be crosslinked, branched or otherwise structured or linear. For example, the starting vinylamide polymer or formed vinylamide polymer adduct may be linear, crosslinked, chain-transferred, or crosslinked & chain-transferred (structured).

Cross linking agents are usually polyethylenically unsaturated crosslinking agents. Examples are methylene bis (meth)acrylamide, triallylammonium chloride; tetraallyl ammonium chloride, polyethyleneglycol diacrylate; polyethyleneglycol dimethacrylate; N-vinyl acrylamide; divinylbenzene; tetra (ethyleneglycol) diacrylate; dimethylallylaminoethylacrylate ammonium chloride; diallyloxyacetic acid, Na salt; diallyloctylamide; trimethyllpropane ethoxylate triacrylate; N-allylacrylamide N-methylallylacrylamide, pentaerythritol triacrylate and combinations thereof. Other systems for crosslinking can be used instead of or in addition to this. For instance covalent crosslinking through pendant groups can be achieved, for instance by the use of ethylenically unsaturated epoxy or silane monomers, or by the use of polyfunctional crosslinking agents such as silanes, epoxies, polyvalent metal compounds or other known crosslinking systems.

Chain transfer agents may be used to synthesize the starting vinylamide or vinylamine polymer. Suitable chain transfer agents are 2-mercaptoethanol; low molecular weight organic acids such as lactic acid, formic acid, malic acid or butyric acid; isopropyl alcohol; thioacids and hypophosphites.

The polyvinylamide, which may be subsequently glyoxalated may be synthesized before glyoxalation by free radical or redox catalysis polymerization of a vinylamide monomer, and optionally one or more ionic comonomer(s) or nonionic comonomers. Cross-linking agents with multiple polymerizable vinyl functionalities can also be included in the formulations to impart structure to the backbone polymer. A chain transfer agent, such as sodium hypophosphite, may be used to control the molecular weight of the polymer molecules, as well as introduce branching.

The water soluble starting polyvinylamide polymers may be formed by any suitable polymerisation process.

The average molecular weight of the polyvinylamide before treatment with a dialdehyde may range from 500 to about 5,000,000 or even 10,000,000 Daltons. For example, the average molecular weight may be greater than 25,000, more preferably may range from about 50,000 to about 200,000, about 25,000 to about 100,000, 200,000, 300,000, 400,000 or 500,000.

Blends

There are several blends encompassed by the invention:

A blend of the first adduct and the second adduct as defined above. The adducts may be made separately then combined in an aqueous premix. The adducts may also be made simultaneously and added as an aqueous premix to the cellulosic furnish or as a coating to paper or board.

Blends of unfunctionalized polyvinylamine in combination with glyoxalated polyvinylamide are also possible.

Unfunctionalized polyvinylamine is polyvinylamine which has not been treated with a dialdehyde to form an adduct.

The first and second adducts may be formed from some common monomers but typically the first and second adducts will be formed from different monomers as explained above. The weight ratio of the first and second adduct can vary from 1:10 to 10:1. Most typically, however, the weight ratio of the adducts will vary from about 1:5 to 5:1, about 1:4 to 4:1, about 1:3 to 3:1 and about 2:1 to 1:2.

Blends of polyvinylamine (glyoxalated or unglyoxalated) with glyoxalated polyvinylamide may be combined as suggested above for the adduct blends.

In regard to the blends of cellulosic reactive polyvinylamine and polyvinylamide, the average molecular weights of starting polyvinylamine (before treatment with a dialdehyde) and starting polyvinylamide (before treatment with a dialdehyde), each polymer may independently be characterized by a different molecular weight. For example, the polyvinylamine may have an average molecular weight of about 200,000 to about 500,000 while the polyvinylamide may have an average molecular weight of about 50,000 to about 150,000.

The polyvinylamine may be lower or higher in average molecular weight than the polyvinylamide.

Cellulose Reactive Agent

The cellulose reactive agent will comprise a compound having at least dialdehyde functionality.

The cellulose reactive reagents are selected from the group consisting of glyoxal, glutaraldehyde, furan dialdehyde, 2-hydroxyadipaldehyde, succinaldehyde, dialdehyde starches, diepoxy compounds, and combinations thereof.

Glyoxal is the preferred cellulose reactive reagent.

The molar ratio of amide (on the polyvinylamide polymer) to cellulose reactive agent will vary from about 12:1 to about 2:1, for example, about 10:1 to about 2.5:1, about 6:1 to about 2.5:1 and about 6:1 to about 3:1.

The molar ratio for the amine (on the polyvinylamine polymer) to cellulose reactive agent will vary from about 1:4 to 15:1. More typically 2:1 to 10:1 molar ratio of amine to cellulose reactive agent is envisioned.

Reaction Conditions

The reaction conditions for both the first and second adduct formation are preferably substantially aqueous. However, inverse emulsions are also envisioned.

Base addition or changing the pH to above 7 is the most common method of catalyzing the glyoxalation reaction of a polyvinylamide. Preferably, a pH range of 7 to 13 is generally considered to be a catalytic environment for the reaction. For example, a pH range of 8 to 12 is especially appropriate.

Polyvinylamine polymer reacts with glyoxal over a wide pH range, and may not need to be base catalyzed. Thus the reaction of the polyvinylamine may take place under basic, acidic or neutral conditions.

Alternatively, a concentrated pH buffer solution may be added to maintain pH.

The polyvinylamine polymer reacts with glyoxal at moderate temperatures to form adducts within a few hours. Typically, the first adduct may be formed at temperatures less than 50° C. or 40° C. and most typically about room temperature. Thus the first adduct may be formed at temperatures ranging from 5° C. to about 40° C. At these temperatures, the first adduct formation is complete within about 1 minute to about 90 Minutes, more typically 5 minutes to about 1 hour.

The polyvinylamide polymer and polyvinylamine may be formed before glyoxalation. The formation of the second adduct (the glyoxalation of polyvinylamide) will normally be carried out at low polyvinylamide concentration but may also be carried out at concentrations that range from about 5 to about 25 wt. %.

The low concentration method for preparation of the glyoxalated polyvinylamide is disclosed in co-pending U.S. Publication Application No. 2008/0064819 herein incorporated entirely by reference. This "low concentration" will depend very much on the average molecular weight of the starting polyvinylamide. For example, the concentration for forming the cellulose reactive polyvinylamide may vary from 0.2% to about 4.5 wt. % of the polyvinylamide polymer, about 0.3 wt. % to less than 4.0 wt. %, about 0.5 to about 3.5 or 1.0 to about 3.0 or about 1.5 to about 2.5 wt. % based on the weight the starting vinylamide polymer.

The formation of the first adduct (the glyoxalation of the polyvinylamine) may be carried out at almost any concentration provided the reaction does not become too viscous or gel. Typically, the glyoxalation of polyvinylamine will be affected by the degree of hydrolysis of the N-vinyl formamide and Mw of the polymer. For example, an N-vinyl formamide polymer of a Mw of approximately 350,000 and 30% hydrolyzed may be carried out a concentration (polyvinylamine polymer) of about 0.1 to about 4 weight %, about 0.5 to about 3.5 wt. % or about 1 to about 3.0 wt. %. For example, vinylamine polymer concentration during adduct formation is less than about 4 wt. %, less than about 3.5 or 3.0 wt. % or less than about 2 wt or 1.5 wt. % or even about 1.0 wt. %.

However, when the first and second adduct are formed simultaneously the concentration of the starting polyvinylamide and starting polyvinylamine are typically kept "low". That is for example, the total concentration for both the starting polyvinylamide and starting polyvinylamine may vary from 0.1% to about 4.5 wt. %, about 0.3 wt. % to less than 4.0 wt. %, about 0.5 to about 3.5 or 1.0 to about 3.0, about 1.0 to about 2.0, or about 1.5 to about 2.5 wt. % of both starting polymers (total starting polymer solids) based on the total weight of the reaction mixture.

The concentration of vinylamine or vinylamide polymer may be less than about 4 wt %, may be less than about 3 wt. % or may be less than 2 wt. % of the reaction mixture at any time during the adduct formation.

Typical glyoxalation of polyvinylamides are carried out at 8 to 12 wt. %.

Compositional and process related advantages have been found when operating glyoxalation processes at significantly lower than the typical concentrations.

One of the advantages of glyoxalating at low concentrations is the ability to glyoxalate relatively high average molecular weight vinylamide polymer without premature gelling of the glyoxalated adduct. For example, most of literature exemplifies glyoxalation reactions wherein the starting vinylamide polymer has an average molecular weight ranging from 5,000 to about 10,000 at concentrations of vinylamide polymer that range from 8 to 12 wt. %. At these concentrations (8-12) the glyoxalation reaction of a relatively high molecular weight of the starting vinylamide polymer (=>25,000) will prematurely gel causing incomplete glyoxalation of the starting polymer and generating an insoluble gel. By glyoxalating at low concentrations, a means is now available to glyoxalate a relatively high molecular weight (=>25,000 or >50,000) starting polyvinylamide which in turn gives better performance on paper or board.

Furthermore, when this reaction is run at a low concentration, it is also possible to run a "dual glyoxalation" without forming highly viscous solutions. For example, a reaction mixture comprising a mixture of polyvinylamide and polyvinylamine may be simultaneously glyoxalted. This dual glyoxalation would have not been possible at typical polyvinylamide concentrations. By running the reactions (dual adduct formation) below say 4 wt. %, below 3 wt. % or below 2 wt. % total weight of the starting polymer solids (polyvinylamide and polyvinylamine), the viscosity of the formed adducts are kept at a manageable viscosity and an improved wet and/or dry strength resin is produced.

Monitoring of Adduct Formation

In prior art processes, adduct formation between vinylamide polymer and glyoxal is monitored by measuring the viscosity of the reaction over time. Once a certain increase in viscosity is achieved for a particular vinylamide polymer, the reaction is quenched by dilution and/or addition of acid.

However, only a very moderate increase in viscosity, a slight decrease in viscosity, or no increase at all is seen at the present concentrations of polyvinylamide and/or polyvinylamine. The inventor has observed that as the glyoxalation of the vinylamide polymer proceeds during the method of the invention, the turbidity of the reaction solution increases. Thus the present method of the invention may follow the glyoxalation reaction with a turbidimeter or a viscometer.

Therefore, adduct formation may be determined by measuring the change in turbidity or viscosity of the aqueous reaction at the start of the reaction or $T_0$ and at a predetermined endpoint $T_e$ ($T_e$-$T_0$).

The predetermined endpoint is for example, a desired increase in turbidity (measure of glyoxalation) for a particular vinylamide or vinylamine polymer. Thus, for example, a vinylamide polymer of 100,000 average molecular weight may give a turbidity of 0 to 5 NTU (nephelometric units) at the beginning of the reaction ($T_0$) and a turbidity change of between 2 to 1000 NTU at the predetermined endpoint. Once the turbidity of the reaction mixture has increase by about 2 to 1000 NTUs the reaction can be quenched to prevent further reaction.

Viscometers and turbidimeters are well known in the art. For example SURFACE SCATTER 7SC turbidimeter is a continuous-monitoring instrument designed for measuring turbidity in fluids. The instrument design is based on the nephelometric principle, where light scattered by particles suspended in the fluid is measured to determine the relative amount of particulate matter in the fluid.

During glyoxalation of the polyvinylamide or polyvinylamine where a viscosity change occurs, (increase or decrease) the extent of reaction may be monitored by the change in viscosity.

Viscosity is typically measured during the reaction using the UL adapter for a BROOKFIELD LV series viscometer. The UL adapter has no spindle number. Only one setting is possible. The base of the adapter cup is removed and the assembly is placed directly into the reaction mixture. Viscosity measurements are automatically recorded every second during the length of the catalyzed reaction. The viscometer is set to a speed of 60 rpm and the temperature of the reaction mixture is maintained at 25° C.

Batch or Continuous Mode

The cellulose reactive polyvinylamine polymers and/or polyvinylamide may be synthesized in a batch or continuous mode. The process of the invention is particularly favorable for implementation in a continuous reactor with pH measurement capability at the papermaking site.

The continuous reactor may be a tubular reactor.

Other variables which affect the rate of glyoxalation include, but are not limited to, pH, temperature, vinylamide polymer molecular weight, vinylamine polymer molecular weight, reaction mixture concentration, molar ratio between vinylamide polymer and glyoxal, molar amide constituency of the vinylamide polymer, molar amine constituency of the polyvinylamine and the presence of substances which interfere with the reaction.

The reaction is normally run at ambient temperatures. However the reaction may be carried out by the process of the invention over a wide temperature range.

The length of the reaction will vary depending on concentration, temperature and pH, as well as other factors.

Other conventional additives which may be added to the glyoxalation reaction are chelating agents to remove polymerization inhibitors, pH adjusters, initiators, buffers, surfactants and other conventional additives.

Application of Polymer Adducts

The adducts or blends of adduct may be used in the manufacture of paper as dilute aqueous solutions. The aqueous solutions may be applied to preformed paper by the tub or impregnation method, or by adding the solutions directly to paper-making fibrous suspensions at any point in the paper-making process where wet- and dry-strength resins are ordinarily applied.

The blends of adducts may be applied simultaneously either as a blend formed before addition to the pulp fiber in the papermaking process or separately but added simultaneously to the wet end of the papermaking process.

The cellulose reactive polyvinylamide and/or polyvinylamine adducts may be applied or incorporated in the wet-end of the papermaking process or applied to the wet paper.

The adducts are formed prior to addition in the wet-end of the papermaking process or applied to the wet or dry paper.

The glyoxalated adducts may be added in the thick or thin stock. When added to the thin stock it may be added before the fan pump or after the pump.

A substantial amount of wet- or dry-strength is imparted when as little as about 0.05 wt. % of the glyoxalated polyvinylamide or glyoxalated polyvinylamine, based on dry fiber weight of the furnish.

For example, dosages of the total glyoxalated polyvinylamide and glyoxalated polyvinylamine weight of about 0.1 to about 20 (0.05-10 kg/metric ton) pounds dry polymer per ton of dry furnish, about 1 to about 12, (0.5-6 kg/metric ton) about 1 to about 9 (0.5-4.5 kg/metric ton), about 1 to about 8 (0.5-4 kg/metric ton) pounds dry polymer per ton of dry furnish is envisioned. More typically ranges of 1.5 to about 6 (1.0-3 kg/metric ton) pounds dry polymer per ton of dry furnish are envisioned.

Application of the first adduct or blends of first adduct and second adduct to wet paper or board may be accomplished by any conventional means. Examples include but are not limited to size press, padding, spraying, immersing, printing or curtain coating.

The first adduct or blends of first adduct and second adduct are absorbed by the paper-making fibers at pH values ranging from about 3.5 to about 8.

The following examples describe certain embodiments of this invention, but the invention is not limited thereto.

EXAMPLES

Example 1

A vinylamide polymer of Mw 100,000 formed from acrylamide and diallydimethylammonium chloride in a 90/10 weight ratio is glyoxalated at 2 wt. % solids with the vinylamide polymer concentration at approximately 1.7 wt. %. The amide:glyoxal molar ratio for the glyoxalation reaction is 4:1. The starting viscosity before glyoxalation is 4.05 cps The viscosity after glyoxalation is 4.75 cps The reaction is followed by monitoring turbidity. The starting turbidity is 4.4 NTU and final turbidity is 13.1 NTU.

NTU units are determined using HACH 2100P turbidimeter.

Example 2

Commercially available N-vinylformamide (Mw=350,000) 30 mole % hydrolyzed to polyvinylamine.

Example 3

70.8 grams of a 12% aqueous solution of 30% hydrolyzed N-vinyl formamide polymer (Mw=350,000) is combined with 425 grams of deionized water and mixed until homogeneous. Next 3.75 grams of 40% aqueous glyoxal is added to the polymer solution. The initial pH of the mixture is 8.3. The pH of the reaction solution is increased to 9.8 with dropwise addition of 5% aqueous sodium hydroxide, and maintained at 9.8 for 30 minutes. Next, the pH of the reaction solution is lowered to 5.0, and the solution is diluted with deionized water to a solids concentration of 0.25%.

Example 4

An aqueous solution of 6 parts by weight of the Example 1 finished adduct is blended with 4 parts by weight of a 30% hydrolyzed N-vinylformamide polymer (Example 2). The solids concentration of the N-vinylformamide polymer was adjusted to 2.0% prior to blending with the aqueous solution from Example 1. The pH of the blended polymer solution is adjusted to 5.5.

Example 5

To start 6 "dry" parts of polymer A are blended in aqueous solution with 4 "dry" parts of polymer B. Polymer A is an aqueous solution vinylamide polymer synthesized by free radical polymerization of acrylamide and DADMAC in a 90/10 weight ratio, and has a Mw of 100,000. Polymer B is an aqueous solution N-vinylformamide polymer, which has been hydrolyzed such that 30% of the pendant formyl groups have been split off and replaced by primary amino groups and has a Mw of 350,000. After blending Polymers A and B, the mixture is diluted with deionized water to a total solids concentration of 1.7%. Next, 40% aqueous glyoxal is added such that the there are 15 parts of "dry" glyoxal present in the mixture for every 85 parts of "dry" polymer. The reaction mixture is continually mixed and monitored for changes in turbidity level. The starting turbidity of the reaction mixture after glyoxal addition is 0.26 NTU. The pH of the solution is raised by drop-wise addition of 5% aqueous sodium hydroxide, until a pH of 9.5 is reached. The pH is maintained at 9.5 by intermittent additions of 5% sodium hydroxide, until a turbidity of 6 NTUs is reached. At this time a drop-wise addition of 5% aqueous sulfuric acid is made to lower the ph to 5.5. This polymer adduct is then diluted with deionised water to 0.25% total solids for use in the handsheet studies.

Handsheets

A handsheet study is carried out to evaluate the dry strength contribution of the examples above. The resins are evaluated at 2.5 pounds per ton based on dry paper slurry weight, with 4 separate handsheets made for each dose condition.

Strength parameters tested in the study include Short Span compression Test (STFI), Burst Strength Index and Tensile Energy Absorption (TEA).

STFI is determined using a MESSMER-BÜCHEL Model K455, according to TAPPI T 826 method.

Burst Strength of paper is determined by TAPPI T-403.

TEA is determined by Instron Model 5565, PATPAC D.34

Experimental Details

Furnish: 50/50 (Hardwood/Softwood) lab stock made in tap water

Freeness: 360 CSF

Thick Stock pH: 7.1

"Wet-End" Temp.: 125 F (Stock heated in microwave)

Resin Dilution: All samples dosed at 0.5% active

Dosing Protocol: Resins are dosed to a fiber slurry with 2.5% solids consistency, the slurry is then mixed for 10 seconds, followed by dilution with tap water to 0.75% slurry solids. The slurry is mixed for an additional 10 seconds prior to sheet formation. 8 inch by 8 inch handsheets are made using a Noble and Wood hand-sheet machine. The sheets are pressed and dried on a drum drier at 240 degrees F.

Target Hand-sheet Weight: 150 Grams Per Square Meter

Each data point below is the average of 12 test results, i.e. 4 handsheets with 3 repeats of each test per sheet.

The Handsheet results are reported in table 1.

The term index refers to a process whereby the actual test results are divided by the actual basis weights of the handsheets to eliminate the error introduced by variations in individual hand-sheet basis weights.

TABLE 1

Handsheet Results

| Example | TEA (Joules/meter$^2$) | Burst Strength Index (kPa*m$^2$/g) | STFI (Nm/g) |
|---|---|---|---|
| Blank | 2.1247 | 5.9025 | 35.54 |
| 1 | 2.2451 | 5.941 | 36.5 |
| 2 | 2.12 | 5.809 | 35.76 |
| 3 | 2.1 | 5.937 | 37.655 |
| 4 | 2.042 | 5.997 | 35.42 |
| 5 | 2.433 | 6.257 | 37.21 |

The blank is paper made by the same process as the other samples (1 thru 5), except that no polymers are added.

What is claimed is:

1. A premixed blend comprising cellulose reactive first and second adducts:
    wherein said first adduct comprises
    a reaction product of a starting polyvinylamine with at least a dialdehyde,
        wherein the starting polyvinylamine is a polymer formed from N-vinylformamide or N-vinylacetamide,
        wherein the polymer is at least partially hydrolyzed to impart a degree of primary amino functionality, prior to the reaction with the dialdehyde; and
    the second adduct comprises a reaction product of a dialdehyde with a starting polyvinylamide,
    with the proviso that the first and second cellulose reactive adducts are different.

2. The premixed blend according to claim 1, wherein the at least partially hydrolyzed polymer is hydrolyzed from about 1 to about 100 mole %.

3. The premixed blend according to claim 1, wherein the dialdehyde is selected from the group consisting of: glyoxal, glutaraldehyde, furan dialdehyde, 2-hydroxyadipaldehyde, and succinaldehyde.

4. The premixed blend according to claim 1, wherein a concentration of starting polyvinylamine is less than about 4 wt. % of the reaction mixture at any time during formation of the first cellulose reactive adduct.

5. The premixed blend according to claim 1, wherein formation of the first cellulose reactive adduct takes place in an inverse emulsion, microemulsion or in a substantially aqueous solution.

6. The premixed blend according to claim 1, wherein the inverse emulsion or microemulsion has a particle size ranging from about 25 nm to about 2000 nm.

7. The premixed blend according to claim 1, wherein the starting polyvinylamide is a polymer or copolymer formed from at least (meth)acrylamide, N-alkyl (meth)acrylamide, or mixtures thereof.

8. The blend according to claim 1, wherein the first cellulose reactive adduct is a glyoxalated polyvinylamine and the second cellulose reactive adduct is a glyoxalated polyvinylamide.

9. A blend of at least a first and a second adduct, wherein said first and second adducts are formed simultaneous by reacting a mixture of a starting polyvinylamine and a starting polyvinylamide with a dialdehyde, wherein the polyvinylamine is a polymer formed from N-vinylformamide or N-vinylacetamide, which polymer is at least partially hydrolyzed to impart a degree of primary amino functionality prior to the reaction with the dialdehyde, and the polyvinylamide is a polymer formed from an ethylenically unsaturated amide comprising (meth)acrylamide, N-alkyl (meth)acrylamide, or mixtures thereof.

10. The blend according to claim 9, wherein a total concentration of the starting polyvinylamine and the starting polyvinylamide is less than about 4 weight percent of the reaction mixture at any stage during the first and second adduct reactions.

11. The blend according to claim 9, wherein the average molecular weights of the starting polyvinylamine and the starting polyvinylamide are each independently greater than 25,000 Daltons.

12. The blend according to claim 11, wherein the average molecular weight of the starting polyvinylamine ranges from about 200,000 to about 500,000 Daltons.

13. The blend according to claim 11, wherein the average molecular weight of the starting polyvinylamide ranges from 50,000 to about 200,000 Daltons.

* * * * *